(12) United States Patent
Chen

(10) Patent No.: US 7,206,872 B2
(45) Date of Patent: Apr. 17, 2007

(54) SYSTEM AND METHOD FOR INSERTION OF MARKERS INTO A DATA STREAM

(75) Inventor: Addison Chen, Honolulu, HI (US)

(73) Assignee: NVIDIA Corporation, Santa Clara, CA (US)

(*) Notice: Subject to any disclaimer, the term of this patent is extended or adjusted under 35 U.S.C. 154(b) by 354 days.

(21) Appl. No.: 10/783,766

(22) Filed: Feb. 20, 2004

(65) Prior Publication Data

US 2005/0188123 A1   Aug. 25, 2005

(51) Int. Cl.
*G06F 3/00* (2006.01)
(52) U.S. Cl. .................. 710/52; 710/3; 710/5; 710/33; 709/230; 709/238; 711/118
(58) Field of Classification Search .................. 710/3, 710/5, 33; 709/230, 238; 711/118
See application file for complete search history.

(56) References Cited

U.S. PATENT DOCUMENTS

| | | | |
|---|---|---|---|
| 212,889 A | 3/1879 | Bridenthal, Jr. et al. | |
| 4,807,111 A | 2/1989 | Cohen et al. | 364/200 |
| 4,839,851 A | 6/1989 | Maki | 364/900 |
| 5,012,489 A | 4/1991 | Burton et al. | 375/8 |
| 5,056,058 A | 10/1991 | Hirata et al. | 364/900 |
| 5,161,193 A | 11/1992 | Lampson et al. | 380/49 |
| 5,163,131 A | 11/1992 | Row et al. | 395/200 |
| 5,307,413 A | 4/1994 | Denzer | 380/49 |
| 5,426,694 A | 6/1995 | Hebert | 379/242 |
| 5,430,727 A | 7/1995 | Callon | 370/85.13 |
| 5,440,551 A | 8/1995 | Suzuki | 370/60 |
| 5,455,599 A | 10/1995 | Cabral et al. | 345/133 |
| 5,485,460 A | 1/1996 | Schrier et al. | 370/94.1 |

(Continued)

FOREIGN PATENT DOCUMENTS

AU   4595297   5/1998

(Continued)

OTHER PUBLICATIONS

Julian Satran, iSCSI—Internet Draft, IETF, Nov. 3, 2002.*

(Continued)

*Primary Examiner*—Kim Huynh
*Assistant Examiner*—Aurangzeb Hassan
(74) *Attorney, Agent, or Firm*—Zilka-Kotab, PC

(57) ABSTRACT

A system and method are provided for inserting Interval Markers in a data stream comprising data blocks. Included is a Buffer having a predetermined number of registers for temporarily and storing data blocks read from a Target System, wherein the Buffer temporarily stores a portion of a data transmission requested from an Initiator System. A Block Counter indicates the number of data blocks in the data stream that have been read into the Buffer. A Marker Offset counter indicates where an Interval Marker are inserted relative to the data blocks in the data stream. A Data Transmitter transmits the data blocks temporarily stored within the Buffer whenever sufficient data is present in the Buffer and Interval Markers have been inserted if required, wherein the Data Transmitter updates the Block Counter and the Marker Offset counter after the contents of the Buffer have been transferred to the Data Transmitter. A Marker Insertion Module inserts Interval Markers at positions in the data stream determined by the value of the Marker offset counter, and the value of the Block Counter.

13 Claims, 6 Drawing Sheets

U.S. PATENT DOCUMENTS

| | | | |
|---|---|---|---|
| 5,495,480 A | 2/1996 | Yoshida | 370/60 |
| 5,499,353 A | 3/1996 | Kadlec et al. | 395/445 |
| 5,513,324 A | 4/1996 | Dolin, Jr. et al. | 395/200.18 |
| 5,519,704 A | 5/1996 | Farinacci et al. | 370/85.13 |
| 5,544,357 A | 8/1996 | Huei | 395/600 |
| 5,546,453 A | 8/1996 | Hebert | 379/242 |
| 5,566,170 A | 10/1996 | Bakke et al. | 370/60 |
| 5,577,105 A | 11/1996 | Baum et al. | 379/93 |
| 5,577,172 A | 11/1996 | Vatland et al. | 395/114 |
| 5,577,237 A | 11/1996 | Lin | 395/555 |
| 5,581,686 A | 12/1996 | Koppolu et al. | 395/340 |
| 5,596,702 A | 1/1997 | Stucka et al. | 395/340 |
| 5,598,410 A | 1/1997 | Stone | 370/469 |
| 5,619,650 A | 4/1997 | Bach et al. | 395/200.01 |
| 5,621,434 A | 4/1997 | Marsh | 345/145 |
| 5,625,678 A | 4/1997 | Blomfield-Brown | 379/93 |
| 5,625,825 A | 4/1997 | Rostoker et al. | 395/730 |
| 5,634,015 A | 5/1997 | Chang et al. | 395/309 |
| 5,636,371 A | 6/1997 | Yu | 395/500 |
| 5,640,394 A | 6/1997 | Schrier et al. | 370/389 |
| 5,650,941 A | 7/1997 | Coelho et al. | 364/514 |
| 5,663,951 A | 9/1997 | Danneels et al. | 370/230 |
| 5,664,162 A | 9/1997 | Dye | 345/521 |
| 5,666,362 A | 9/1997 | Chen et al. | 370/420 |
| 5,675,507 A | 10/1997 | Bobo, II | 364/514 |
| 5,678,060 A | 10/1997 | Yokoyama et al. | 395/831 |
| 5,680,605 A | 10/1997 | Torres | 395/603 |
| 5,687,314 A | 11/1997 | Osman et al. | 395/200 |
| 5,696,899 A | 12/1997 | Kalwitz | 395/200.1 |
| 5,699,350 A | 12/1997 | Kraslavsky | 370/254 |
| 5,701,316 A | 12/1997 | Alferness et al. | 371/53 |
| 5,727,149 A | 3/1998 | Hirata et al. | 395/200.8 |
| 5,734,852 A | 3/1998 | Zias et al. | 395/334 |
| 5,734,865 A | 3/1998 | Yu | 395/500 |
| 5,748,905 A | 5/1998 | Hauser et al. | 395/200.79 |
| 5,754,540 A | 5/1998 | Liu et al. | 370/315 |
| 5,754,556 A | 5/1998 | Ramseyer et al. | 371/10.3 |
| 5,761,281 A | 6/1998 | Baum et al. | 379/93.29 |
| 5,778,178 A | 7/1998 | Arunachalam | 395/200.33 |
| 5,790,546 A | 8/1998 | Dobbins et al. | 370/400 |
| 5,790,676 A | 8/1998 | Ganesan et al. | 380/23 |
| 5,802,287 A | 9/1998 | Rostoker et al. | 395/200.8 |
| 5,802,306 A | 9/1998 | Hunt | 395/200.58 |
| 5,805,816 A | 9/1998 | Picazo, Jr. et al. | 395/200.53 |
| 5,809,235 A | 9/1998 | Sharma et al. | 395/200.6 |
| 5,815,516 A | 9/1998 | Aaker et al. | 371/53 |
| 5,818,935 A | 10/1998 | Maa | 380/20 |
| 5,826,032 A | 10/1998 | Finn et al. | 395/200.66 |
| 5,854,750 A | 12/1998 | Phillips et al. | 364/478.04 |
| 5,870,549 A | 2/1999 | Bobo, II | 395/200.36 |
| 5,870,622 A | 2/1999 | Gulick et al. | 395/800.35 |
| 5,872,919 A | 2/1999 | Wakeland | 395/200.6 |
| 5,877,764 A | 3/1999 | Feitelson et al. | 345/347 |
| 5,894,557 A | 4/1999 | Bade et al. | 395/200.58 |
| 5,909,546 A | 6/1999 | Osborne | 395/200.42 |
| 5,918,051 A | 6/1999 | Savitzky et al. | 395/683 |
| 5,920,732 A | 7/1999 | Riddle | 395/876 |
| 5,923,892 A | 7/1999 | Levy | 395/800.31 |
| 5,935,268 A | 8/1999 | Weaver | 714/758 |
| 5,937,169 A | 8/1999 | Connery et al. | 395/200.8 |
| 5,941,988 A | 8/1999 | Bhagwat et al. | 713/201 |
| 5,943,481 A | 8/1999 | Wakeland | 395/200.6 |
| 5,946,487 A | 8/1999 | Dangelo | 395/705 |
| 5,966,534 A | 10/1999 | Cooke et al. | 395/705 |
| 5,968,161 A | 10/1999 | Southgate | 712/37 |
| 5,974,518 A | 10/1999 | Nogradi | 711/173 |
| 5,991,299 A | 11/1999 | Radogna et al. | 370/392 |
| 5,999,974 A | 12/1999 | Ratcliff et al. | 709/224 |
| 6,014,699 A | 1/2000 | Ratcliff et al. | 709/224 |
| 6,034,963 A | 3/2000 | Minami et al. | 370/401 |
| 6,046,980 A | 4/2000 | Packer | 370/230 |
| 6,049,857 A | 4/2000 | Watkins | 711/207 |
| 6,061,368 A | 5/2000 | Hitzelberger | 370/537 |
| 6,061,742 A | 5/2000 | Stewart et al. | 709/250 |
| 6,067,569 A | 5/2000 | Khaki et al. | 709/224 |
| 6,076,115 A | 6/2000 | Sambamurthy et al. | 709/250 |
| 6,078,736 A | 6/2000 | Guccione | 395/500.17 |
| 6,081,846 A | 6/2000 | Hyder et al. | 709/250 |
| 6,085,234 A | 7/2000 | Pitts et al. | 709/217 |
| 6,092,110 A | 7/2000 | Maria et al. | 709/225 |
| 6,092,229 A | 7/2000 | Boyle et al. | 714/748 |
| 6,098,188 A | 8/2000 | Kalmanek, Jr. et al. | 714/746 |
| 6,101,543 A | 8/2000 | Alden et al. | 709/229 |
| 6,122,670 A | 9/2000 | Bennett et al. | 709/236 |
| 6,151,625 A | 11/2000 | Swales et al. | 709/218 |
| 6,157,955 A | 12/2000 | Narad et al. | 709/228 |
| 6,172,980 B1 | 1/2001 | Flanders et al. | 370/401 |
| 6,172,990 B1 | 1/2001 | Deb et al. | 370/474 |
| 6,173,333 B1 | 1/2001 | Jolitz et al. | 709/240 |
| 6,182,228 B1 | 1/2001 | Boden et al. | 713/201 |
| 6,185,619 B1 | 2/2001 | Joffe et al. | 709/229 |
| 6,208,651 B1 | 3/2001 | Van Renesse et al. | 370/392 |
| 6,226,680 B1 | 5/2001 | Boucher et al. | 709/230 |
| 6,230,193 B1 | 5/2001 | Arunkumar et al. | 709/218 |
| 6,233,626 B1 | 5/2001 | Swales et al. | 710/11 |
| 6,247,060 B1 | 6/2001 | Boucher et al. | 709/238 |
| 6,247,068 B1 | 6/2001 | Kyle | 709/328 |
| 6,301,612 B1 | 10/2001 | Selitrennikoff et al. | 709/220 |
| 6,327,625 B1 | 12/2001 | Wang et al. | 709/235 |
| 6,330,659 B1 | 12/2001 | Poff et al. | 712/34 |
| 6,334,153 B2 | 12/2001 | Boucher | 709/230 |
| 6,341,129 B1 | 1/2002 | Schroeder et al. | 370/354 |
| 6,345,301 B1 | 2/2002 | Burns et al. | 709/230 |
| 6,347,347 B1 | 2/2002 | Brown et al. | 710/23 |
| 6,389,479 B1 | 5/2002 | Boucher et al. | 709/243 |
| 6,389,537 B1 | 5/2002 | Davis et al. | 713/187 |
| 6,393,487 B2 | 5/2002 | Boucher et al. | 709/238 |
| 6,397,316 B2 | 5/2002 | Fesas, Jr. | 711/200 |
| 6,427,169 B1 | 7/2002 | Elzur | 709/224 |
| 6,427,171 B1 | 7/2002 | Craft | 709/230 |
| 6,427,173 B1 | 7/2002 | Boucher | 709/238 |
| 6,430,628 B1 | 8/2002 | Conner | 710/5 |
| 6,434,620 B1 | 8/2002 | Boucher et al. | 709/253 |
| 6,460,080 B1 | 10/2002 | Shah et al. | 709/224 |
| 6,470,415 B1 | 10/2002 | Starr | 711/104 |
| 6,530,061 B1 | 3/2003 | Labatte | 714/807 |
| 6,591,302 B2 | 7/2003 | Boucher | 709/230 |
| 6,609,225 B1 | 8/2003 | Ng | 714/781 |
| 6,629,141 B2 | 9/2003 | Elzur et al. | 709/224 |
| 6,658,480 B2 | 12/2003 | Boucher | 709/239 |
| 6,687,758 B2 | 2/2004 | Craft | 709/250 |
| 6,697,868 B2 | 2/2004 | Craft | 709/230 |
| 6,751,665 B2 | 6/2004 | Philbrick | 709/224 |
| 6,757,746 B2 | 6/2004 | Boucher | 709/250 |
| 6,807,581 B1 | 10/2004 | Starr | 709/250 |
| 6,845,403 B2 * | 1/2005 | Chadalapaka | 710/5 |
| 6,938,092 B2 | 8/2005 | Burns | 709/230 |
| 6,941,386 B2 | 9/2005 | Craft | 709/250 |
| 6,965,941 B2 | 11/2005 | Boucher | 709/230 |
| 6,996,070 B2 | 2/2006 | Starr | 370/252 |
| 7,042,898 B2 | 5/2006 | Blightman | 370/463 |
| 2001/0021949 A1 | 9/2001 | Blightman et al. | 709/219 |
| 2001/0023460 A1 | 9/2001 | Boucher et al. | 709/250 |
| 2001/0027496 A1 | 10/2001 | Boucher et al. | 709/250 |
| 2001/0036196 A1 | 11/2001 | Brightman | 370/465 |
| 2001/0037397 A1 | 11/2001 | Boucher | 709/230 |
| 2001/0037406 A1 | 11/2001 | Phllbrick | 709/250 |
| 2001/0047433 A1 | 11/2001 | Boucher et al. | 709/250 |
| 2002/0055993 A1 | 5/2002 | Shah et al. | 709/223 |
| 2001/0087732 | 7/2002 | Boucher | 709/250 |
| 2001/0091844 | 7/2002 | Craft | 709/230 |
| 2002/0085562 A1 | 7/2002 | Hufferd et al. | 370/392 |
| 2002/0087732 A1 | 7/2002 | Boucher et al. | 709/250 |
| 2002/0091844 A1 | 7/2002 | Craft et al. | 709/230 |

| | | | | |
|---|---|---|---|---|
| 2002/0095519 A1 | 7/2002 | Philbrick et al. ............ 709/250 | | |
| 2002/0120899 A1 | 8/2002 | Gahan et al. ................ 714/748 | | |
| 2002/0147839 A1 | 10/2002 | Boucher et al. ............ 709/238 | | |
| 2002/0156927 A1 | 10/2002 | Boucher ...................... 709/250 | | |
| 2002/0161919 A1 | 10/2002 | Boucher ...................... 709/238 | | |
| 2002/0163888 A1 | 11/2002 | Grinfeld ..................... 370/235 | | |
| 2003/0005142 A1 | 1/2003 | Elzur et al. ................. 709/232 | | |
| 2003/0005143 A1 | 1/2003 | Elzur et al. ................. 709/232 | | |
| 2003/0014544 A1 | 1/2003 | Pettey ......................... 709/249 | | |
| 2003/0016669 A1 | 1/2003 | Pfister et al. ............... 370/392 | | |
| 2003/0031172 A1 | 2/2003 | Grinfeld ..................... 370/389 | | |
| 2003/0046330 A1 | 3/2003 | Hayes ........................ 709/201 | | |
| 2003/0046418 A1 | 3/2003 | Raval et al. ................ 709/237 | | |
| 2003/0056009 A1 | 3/2003 | Mizrachi et al. ............ 709/245 | | |
| 2003/0058870 A1 | 3/2003 | Mizrachi et al. ....... 370/395.52 | | |
| 2003/0061505 A1 | 3/2003 | Sperry et al. ............... 713/200 | | |
| 2003/0066011 A1 | 4/2003 | Oren .......................... 714/758 | | |
| 2003/0079033 A1 | 4/2003 | Craft .......................... 709/230 | | |
| 2003/0084185 A1 | 5/2003 | Pinkerton ................... 709/236 | | |
| 2003/0095567 A1 | 5/2003 | Lo et al. ..................... 370/466 | | |
| 2003/0115350 A1 | 6/2003 | Uzrad-Nali et al. ........ 709/231 | | |
| 2003/0115417 A1 | 6/2003 | Corrigan ..................... 711/118 | | |
| 2003/0128704 A1 | 7/2003 | Mizrachi et al. ............ 370/394 | | |
| 2003/0140124 A1 | 7/2003 | Burns ......................... 709/220 | | |
| 2003/0145101 A1 | 7/2003 | Mitchell et al. ............ 709/236 | | |
| 2003/0145270 A1 | 7/2003 | Holt ........................... 714/766 | | |
| 2003/0167346 A1 | 9/2003 | Craft et al. ................. 709/250 | | |
| 2003/0200284 A1 | 10/2003 | Philbrick et al. ........... 709/219 | | |
| 2004/0003126 A1 | 1/2004 | Boucher ...................... 709/250 | | |
| 2004/0024894 A1* | 2/2004 | Osman et al. ............... 709/230 | | |
| 2004/0054813 A1 | 3/2004 | Boucher ...................... 709/250 | | |
| 2004/0062245 A1 | 4/2004 | Sharp ......................... 370/392 | | |
| 2004/0062246 A1 | 4/2004 | Boucher ...................... 370/392 | | |
| 2004/0064578 A1 | 4/2004 | Boucher ...................... 709/236 | | |
| 2004/0064589 A1 | 4/2004 | Boucher ...................... 709/250 | | |
| 2004/0064590 A1 | 4/2004 | Starr ........................... 709/250 | | |
| 2004/0073703 A1 | 4/2004 | Boucher ...................... 709/250 | | |
| 2004/0078462 A1 | 4/2004 | Philbrick .................... 709/224 | | |
| 2004/0088262 A1 | 5/2004 | Boucher ........................ 705/65 | | |
| 2004/0100952 A1 | 5/2004 | Boucher ...................... 370/389 | | |
| 2004/0111535 A1 | 6/2004 | Boucher ...................... 709/250 | | |
| 2004/0117509 A1 | 6/2004 | Craft .......................... 709/250 | | |
| 2004/0158640 A1 | 8/2004 | Philbrick .................... 709/230 | | |
| 2004/0158793 A1 | 8/2004 | Blightman .................. 714/758 | | |
| 2004/0240435 A1 | 12/2004 | Boucher ...................... 370/352 | | |
| 2005/0122986 A1 | 6/2005 | Starr ........................... 340/412 | | |
| 2005/0141561 A1 | 6/2005 | Craft .......................... 370/474 | | |
| 2005/0160139 A1 | 7/2005 | Boucher ...................... 709/203 | | |
| 2005/0175003 A1 | 8/2005 | Craft .......................... 370/389 | | |
| 2005/0182841 A1 | 8/2005 | Starr ........................... 709/228 | | |
| 2005/0198187 A1 | 9/2005 | Craft .......................... 709/217 | | |
| 2005/0204058 A1 | 9/2005 | Philbrick .................... 709/238 | | |
| 2005/0278459 A1 | 12/2005 | Boucher ...................... 709/250 | | |
| 2006/0010238 A1 | 1/2006 | Craft .......................... 709/227 | | |

FOREIGN PATENT DOCUMENTS

| | | |
|---|---|---|
| AU | 7364898 | 11/1998 |
| AU | 4435999 | 12/1999 |
| AU | 723724 | 9/2000 |
| AU | 0070603 | 3/2001 |
| AU | 734115 | 6/2001 |
| AU | 0741089 | 11/2001 |
| AU | 0228874 | 5/2002 |
| CA | 2265692AA | 5/1998 |
| CA | 2287413AA | 11/1998 |
| CA | 2328829AA | 12/1999 |
| CA | 2265692 C | 8/2001 |
| CN | 1237295 A | 12/1999 |
| CN | 1266512 T | 9/2000 |
| CN | 1305681 T | 7/2001 |
| TW | 447205 B | 7/2001 |
| TW | 448407 B | 8/2001 |
| WO | WO98/21655 | 5/1998 |
| WO | WO 98/50852 | 11/1998 |
| WO | WO 99/65219 | 12/1999 |
| WO | WO 01/13583 | 2/2001 |
| WO | WO 01/28179 | 4/2001 |
| WO | WO 02/027519 A1 | 4/2002 |
| WO | WO 02/39302 | 5/2002 |
| WO | WO 02/059757 | 8/2002 |
| WO | WO 02/086674 | 10/2002 |
| WO | WO 03/021443 | 3/2003 |
| WO | WO 03/021447 | 3/2003 |
| WO | WO 03/021452 | 3/2003 |

OTHER PUBLICATIONS

Muller, Raimund, LON-das universelle Netzwerk Elektronik 22-1991.
Abbot, Mark B.; Peterson, Larry L., "Increasing Network Trhoguhput by Integrating Protocol Layers" IEEE 1993.
Wright, Maury, Low-Cost Control LANs Add Automation to Homes, Autos, and Offices EDN-Technology Jul. 20, 1992.
Preston, David J., "Internet Protocols Migrate To Silicon For Networking Devices" Electronic Design Apr. 14, 1997.
Chesson, Greg, "The Protocol Engine Project" Technology Focus Sep. 1987.
Chesson, Greg, "Proceedings of the Summer 1987 USENIX Conference" USENIX Association Jun. 8-12, 1987.
G. Chesson and L. Green, "XTP Protocol Engine VLSI for Real-Time LANS" EFOC/LAN Jun. 29-Jul. 1, 1968.
Wayner, "Sun Gambles on Java Chops", Bytes, Nov. 1996.
Raz, "Real Time Program Language Accelerator", WO 98/21655, May 1998.
Agrawal et al. "Architecture and Design of the Mars Hardware Accelerator", ACM 1987, pp. 101-107.
Case, "Implementing the Java Virtual Machine", Microprocessor Report, Mar. 1996.
Kitadeya et al., "Matsushita Launches Web TV Internet Connection Terminal", http://www.mei.co.ip/corp/news/official.data/data.dir/en981112-1/en981112-1.html, Nov. 1998.
iReady Product Data Sheet, Internet Tuner.
Johnson et al. , "Internet Tuner", New Media News, http://www.newmedianews.com/020197/ts.sub-_inettuner.html, Jan. 1997.
Kelly, T., "Cheap Internet Hardware that Fits in Everything", ZDNet, http://www.zdnet.co.uk/news/1998/44/ns-5998.html, Nov. 1998.
8802-3:2000 ISO/IEC Information Technology, http://www.computer.org/cspress/CATALOG/st01118.htm.
INCITS: Development work conducted in t10-I/O Interface-Lower Level Sep. 30, 2002 Weber, Ralph O.
Stevens, Richard W., "TCP/IP Illustrated Volume" Addison-Wesley Professional Computing Series.
Abbot, Mark B., and Peterson, Larry L., "Increasing Network Throughput by Integrating Protocol Layers" IEEE 1993.
Wright, Maury, "Low-Cost Control LANs Add Automation to Homes, Autos, and Offices" EDN Jul. 20, 1992.
Muller, Raimund, "LON—das universelle Netzwerk" Electronik 22/1991.
Rang, Michael; Tantawy, Ahmed, "A Design Methodology for Protocol Processors" IEEE 1995.
Banks, David and Prudence, Michael, "A High-Performance Network Architecture for a PA-RISC Workstation" IEEE Journal vol. II, No. 22 Feb. 1993.
Steenkiste, Peter, "A High-Speed Network Interface for Distributed-Memory Systems: Architecture and Applications" ACM Transactions on Computer Systems, vol. 15, No. 1 Feb. 1997.
Doumenis, Gr.A., Konstantoulakis, G.E., Reisis, D.I.and Stassinopoulos, G.I. "A Personal Computer Hosted Terminal Adapter For The Broadband Integrated Services Digital Network and Applications" National Technical University of Athens, Greece.
Womack, Lucas; Mraz, Ronald; Mendelson, Abraham, "A Study of Virtual Memory MTU Reassembly withing the PowerPC Architecture" IEEE 1997.

Steenkiste, Peter, "A Systematic Approach to Host Interface Design for High-Speed Networks" IEEE Mar. 1994.

Wittie, Larry D.; Ma, Fanyuan, "A TCP/IP Communication Subsystem in Micros" IEEE 1987.

Dalton, Chris; Watson, Greg; Banks, David; Calamvokis, Costas; Edwards, Aled; Lumley, John, "Afterburner: A Network-independent card provides architectural support for high-performance protocols" IEEE Jul. 1993.

Gupta, Pankaj; McKeown, Nick, "Algorithms for Packet Classification" IEEE Network Mar./Apr. 2001.

Clark, David D.; Romkey, John; Salwen, Howard, "An Analysis of TCP Processing Overhead" IEEE 1988.

Clark, David D.; Jacobson, Van; Romkey, John; Salwen, Howard, "An Analysis of TCP Processing Overhead" IEEE Jun. 1989.

Goloi, W.K.; Behr, P. "An IPC Protocol and Its Hardware Realization For A High-Speed Distributed Multicomputer System" IEEE 1981.

Ames, Richard, "Building an Embedded Web Server from Scratch" Circuit Cellar INK Feb. 1998.

Legg, John, "Choosing and implementing an embedded TCP/IP Stack" Electronic Product Design Jan. 1999.

Orphanos, George; Birbas, Alexios; Petrellis, Nikos; Mountzouris, Ioannis; Malatraras, Andrea, "Compensating for Moderate Effective Throughput at the Desktop" IEEE Communication Magazine Apr. 2000.

Yocum, Kenneth G.; Chase, Jeffrey S.; Gallatin, Andrew J.; Lebeck, Alvin R., Cut-Through Delivery in Trapeze: An Exercise in Low-Latency Messaging IEEE 1997.

Varada, S.; Yang, Y.; Evans, D., "Data and Buffer Management in ATM Systems" TranSwitch Corporation.

Bonjour, Dominique; de Hauteclocque, Gaelle; le Moal, Jacques, "Design and Application of ATM LAN/WAN Adapters" IEEE 1998.

Kim, Chan; Jun, Jong-Jun; Park, Yeong-Ho; Lee, Kyu-Ho; Kim, Hyup-Jong, "Design and Implementation of a High-Speed ATM Host Interface Controller" Electronics and Telecommunications Research Institute, Korea.

Steenkiste, Peter, "Design, Implementation, and evaluation of a Single-copy Protocol Stack" Software—Practice and Experience, vol. 28, Jun. 1998.

Meleis, Hanafy E.; Serpanos, Dimitrios, N., "Designing Communication Subsystems for High-Speed Networks" IEEE Network Jul. 1992.

Doumenis, Gr. A.; Reisis, D.I.; Stassinopoulos, G.I., "Efficient Implementation of the SAR Sublayer and the ATM Layer in High-Speed Broadband ISDN Data Terminal Adapters" IEEE 1993.

Mora, F.; Sebastia, A., "Electronic Design of a High Performance Interfacce to the SCI Network" IEEE 1998.

Eady, Fred, "Embedded Internet Part 2: TCP/IP and a 16-Bit Compiler" Embedded PC Jun. 1999.

Shivam, Piyush; Wyckoff, Pete; Panda, Dhabaleswar, "EMP: Zero-copy OS-bypass NIC-driven Gigabit Ethernet" SC2001 Nov. 2001, Denver, CO, USA.

Mansour, Mohammad; Kayssi, Ayman, "FPGA-Based Internet Protocol Version 6 Router" IEEE 1998.

Smith, Jonathon M.; Traw, C. Brendan S., "Giving Applications Access to Gb/s Networking" IEEE Network Jul. 1993.

Traw, C. Brendan S.; Smith, Jonathan M., "Hardware/Software Organization of a High-Performance ATM Host Interface" IEEE 1993.

Nagata, Takahiko; Hosoda, Yamashita, Hiroyuki, "High-Performance TCP/IP/ATM Communication Board" NTT Information and Communication Systems Laboratories 1998.

Nagata, Takahiko; Hosoda, Yasuhiro; Yamahsita, Hiroyuki, "High-Performance TCP/IP/ATM Communication Boards:Driving Force for Various Multimedia Services" vol. 9 No. 6 Nov. 1997.

Jolitz, William Frederick, "High-Speed Networking: Header prediction and forward-error correction for very high-speed data transfer" Dr. Dobbs Journal, Aug. 1992.

Chiswell, Dave "Implementation Challenges for 155Mbit ATM Adapters" ISBN# 0-7803-2636-9.

Wright, Maury "Intelligent Ethernet Boards" EDN Jun. 23, 1988.

Preston, David "Intetnet Protocols Migrate to Silicon For Networking Devices" Electronic Design Apr. 14, 1997.

Ivanov-Loshkanov, V.S.; Sevast'yanov, S.F., Semenov, M.N., "Network Microprocessor Adapter" Avtmatika i Vyshislitel'naya Tekhnika vol. 17 No. 5 pp. 25-28, 1983.

Druschel, Peter; Abbot, Mark B.; Pagels, Michael A.; Peterson, Larry L., "Network Subsystem Design" IEEE Network Jul. 1993.

Huange, Jau-Hsiung; Chen, Chi-Wen, "On Performance Measurments of TCP/IP and its Device Driver" IEEE 1992.

Siegel, Martin; Williams, Mark; Robler, Georg, "Overcoming Bottlenecks in High-Speed Transport Systems" IEEE 1991.

Neufeld, Gerald W.; Ito, Mabo Robert; Goldberg, Murray; McCutcheon, Mark J.; Ritchie, Stuart, "Paralleel Host Interface for an ATM Network" IEEE Network Jul. 1993.

Maly, K.; Khanna, K.; Kukkamala, R.; Overstreet C.M.; Yerraballi, R.; Foundriat, E.C.; Madan, B., "Parallel TCP/IP For Multiprocessor Workstations" High Performance Networking, IV, 1993 IFIP.

Laskman, T.V.; Madhow, U., "Performance Analysis of Window-based Flow Control using TCP/IP:Effect of High Bandwidth Delay Products and Random Loss" High Performance Networking V. 1994 IFIP.

Ramakrishnan, K.K., "Performance Considerations in Designing Network Interfaces" IEEE Journal1993.

Camarda, P.; Pipio, F.; Piscitelli, G.; "Performance evaluating of TCP/IP implementations in end systems" IEE Proc-Computer Digital Tech. vol. 146 No. 1 Jan. 1999.

Toyoshima, Kan; Shirakawa, Kazuhiro; Hayashi, Kazuhiro, "Programmable ATM Adapter: Rapid Prototyping of Cell Processing Equipment for ATM Network" IEEE 1997.

Blumrich, Matthias A.; Dubnicku, Cezary; Felton, Edward W.; Li, Kai, "Protected, User-level DMA for the SHRIMP Network Interface" IEEE 1996.

Feldmeier, David C.; McAuley, Anthony J.; Smith, Jonathan M., Bakin, Deborah S.; Marcus, William S.; Raleigh, Thomas M., "Protocol Boosters" IEEE 1998.

Marcus, William S.; Hadzic, Ilija; McAuley, Anthony J.; Smith, Jonathan M., "Protocol Boosters: Applying Programmability to Network Infrastructures" IEEE Communications Magazine Oct. 1998.

Korablum, Deborah F., "Protocol Implementation and Other Performance Issues for Local and Metropolitan Area Networks" EEE 1988.

Dittia, Zubin D.; Parulkar, Guru M.; Jr., Jerome R. Cox, "The APIC Approach to High Performance Network Interface Design: Protect4ed DMA and Other Techniques" IEEE 1997.

Rutsche, Erich, "The Architecture of a Gb/s Multimedia Protocol Adapter" ACM SIGCOMM Computer Communication Review.

Moldeklev, Kjersti; Klovning, Espen; Kure, Oivind, "The effect of end system hardware and software on TCP/IP throughput performance over a local ATM Network".

Kanakia, Hermant; Cheriton, David R., "The VMP Network Adapter Board (NAB) High Performance Network Communication for Multiprocessors" ACM 1988.

Chandrammenon, Grish P.; Varghese, George, "Trading Packet Headers for Packet Processing" IEEE 1996.

Nielson, Dr. Michael J.K., "TURBOchannel" IEEE 1991.

New Media News, www.newmedianews.com/02197/ts_inettuner. html.

Kelly, T. "Cheap Internet Hardware that Fits in Everything" ZDNet, www.zdnet.co.uk/news/1998/77/ns-5998.html.

Kitadeya et al. "Matsushita Launches WebTV Internet Connection Terminal" www.mei.co.jp/corp/news/official.data.dir/en981112-1/en981112-1html.

Eady Product Data Sheet, Internet Tuner.

Luijten, Ronald P., "An OC-12 ATM Switch Adapter Chipset" 1998 IEEE.

"Less-Numerical Algorithms", Ch. 20 p. 888-895 "Storage Networking Industry Association" iSCSI Building Blocks for IP Storage Networking, www.ipstorage.org.

"American National Standard: SCSI Architecture Model—2 (SAM-2)" ANSI INCITS 366-2003.

* cited by examiner

SYSTEM AND METHOD FOR INSERTION OF MARKERS INTO A DATA STREAM

FIELD OF THE INVENTION

This invention relates to the field of data transmission and more particularly to a method and system for inserting Interval Markers in a block based data transmission system.

BACKGROUND OF THE INVENTION

As the internet and computer networking continue to evolve, data transmission speeds are increasing as well as the amount of data transmitted. The increase in data traffic is occurring in Local Area Networks (LANs) based on Ethernet and other transport mechanisms such as Wide Area Networks (WANs) and Storage Area Networks (SANs) which could use Ethernet or any of a number of data transport mechanisms. Similarly, the amount of data moving through Internet Protocol (IP) based networks such as the internet continues to grow substantially.

Accordingly, users face a growing need for new ways to store and maintain their data. Today's technology offers three basic storage options: Direct Attached Storage (DAS), Network Attached Storage (NAS) and Storage Area Networks (SAN).

In its most basic form, Direct Attached Storage consists of a disk drive directly attached to a personal computer or server. One of the most common methods of transferring data between a hard drive and its associated personal computer or server is the Small Computer Systems Interface (SCSI). Other methods, such as SATA and IDE are well known.

The SCSI protocol uses commands to transfer data as blocks, which are low level, granular units used by storage devices, as opposed to LANs, which typically use file based methods for transferring data. The overall operation and an architectural description of the SCSI protocol is available from the American National Standards Institute (ANSI), the specific specification having the designation ANSI/INCITS 366-2003, titled *Information Technology—SCSI Architecture Model-2* (SAM-2), herein incorporated reference, and herein referred to as the SCSI Specification.

As internet traffic and storage needs have grown, there is a growing convergence between storage devices, protocols, and IP based transport mechanisms. For example, current SCSI storage devices are designed to work over a parallel cable having a maximum cable length of 12 meters, While IP based transport mechanisms have no data transmission distance limitation.

At the present time, the storage industry and the various industry entities responsible for developing and maintaining the various Internet Protocols are working together to develop standards to enable SCSI based data transfers over the internet. Specifically, the IP Storage (IPS) Working Group of the Internet Engineering Task Force (IEF) is in the process of finalizing a specification for encapsulating SCSI commands in the known TCP/IP protocol. The Internet SCSI (iSCSI) protocol for block storage is predicated on standard Ethernet transports. The iSCSI protocol defines the rules and processes to transmit and receive block storage data over TCP/IP networks. iSCSI replaces the parallel SCSI direct cabling scheme with a network fabric. iSCSI is transport independent and will support any media that supports TCP/IP. Servers and storage devices that support iSCSI connect directly to an existing IP switch and router infrastructure. iSCSI enables SCSI-3 commands to be encapsulated in TCP packets and delivered reliability over IP networks. The iSCSI specification is complete and undergoing final ratification within the IETF. The current iSCSI specification is available from the IETF under the designation draft-ietf-ips-iscsi-20.txt, dated Jan. 19, 2003, and herein referred to as the iSCSI Specification. iSCSI network interfaces under development will be capable of transferring data over the internet in speeds approaching 20 Gbits/sec. The iSCSI protocol is just one example of a network storage protocol, which may employ the Interval Marker System and Method on the present invention, although those skilled in the art will appreciate that the method and system of the present invention is useful in any type of data transfer protocol where Interval Markers are useful or required.

SUMMARY OF THE INVENTION

A System and Method for inserting Interval Markers in a data stream is provided. In one embodiment of the present invention, Interval Markers are inserted between data blocks comprising a data stream transmitted from a storage device to a storage application. A connection between a storage device and the storage application is established wherein the connection is defined by a plurality of parameters, including the number of data blocks to be transmitted and the desired intervals between Interval Markers in the data stream. Data blocks from the storage device are read into a Buffer having a predetermined number of registers. The data blocks are read into the registers in groups of data blocks.

The predetermined number of registers is determined by the number of data blocks within the groups of data blocks and the size of the Buffer includes sufficient registers for simultaneously storing at least first and second groups of data blocks as well as registers for storing Interval Markers.

A Block Counter is initialized at the beginning of the connection for counting the data blocks and is incremented as they are read into the registers. The Block Counter is continuously updated to indicate how many registers in the Buffer contain valid data blocks. A Marker Offset Counter is also initialized at the beginning of the connection, and the Marker Offset Counter is continuously updated to indicate the next location for insertion of an Interval Marker between the data blocks within the data stream. Interval Markers are inserted between data blocks stored in the registers as indicated by the values of the Block Counter and the Marker Offset Counter. The data blocks and Interval Markers are transmitted to the storage application to generate a data stream, when the Block Counter and Marker Offset Counter indicate there is sufficient data in the registers for transmission.

In one embodiment of the present invention, Interval Markers may be used as a Fixed Interval Marker (FIM) as defined in the iSCSI specification, although the present invention may be used in any data transmission scheme where Interval Markers or delimiters are required. The iSCSI specification requires that data blocks are dword aligned and that Fixed Interval Markers are required at fixed intervals for data flow management. The iSCSI specification does not describe any specific implementation for the creation or insertion of Fixed Interval Markers. It only requires that Fixed Interval Markers may be inserted at predetermined locations relative to the data blocks in the data stream to be transmitted. One method for complying with the iSCSI specification would be to cache all the requested data blocks in memory and to calculate and insert the FIM based on the entirety of data blocks cached in memory. The iSCSI specification requires 32-bit dwords and any given data transmission may include thousands of dwords. In this case a massive amount of memory would be required to cache the entire data transmission. In addition, a significant amount of latency would accumulate while the data is read into memory and the numerous Fixed Interval Markers are calculated and inserted, prior to transmission.

One advantage of the present invention is that it only requires a Buffer having a predetermined size. For example, in the embodiment of the present invention described below, a Buffer having ten (10) 32-bit registers, which store 10 32-bit dwords is shown. A dword is defined as a group of bits constituting a single data block. Depending on the application, dwords can vary in width. For example, dwords can be defined as 8, 16, 32, or 64-bit structures, or even wider, provided they are used consistently within a specific application. The Buffer includes a portion for receiving data, a portion for outputting data, and additional registers for inserting Markers and optimizing data transfers, particularly when Marker insertion occurs during a transmission boundary.

When a data transmission is required, data is read into the Buffer from a Data Storage Module. The data blocks are then managed as they move through the Buffer and are output to a Network Stack when the output portion of the Buffer is filled with valid data blocks. Thus, the present invention can transmit massive amounts of data, without the need for a large data cache. The present invention eliminates latency since data is read into, and read out of, the Buffer on a real time basis. Accordingly, the present invention is particularly useful in streaming data applications.

DETAILED DESCRIPTION OF THE INVENTION

Figure 1:
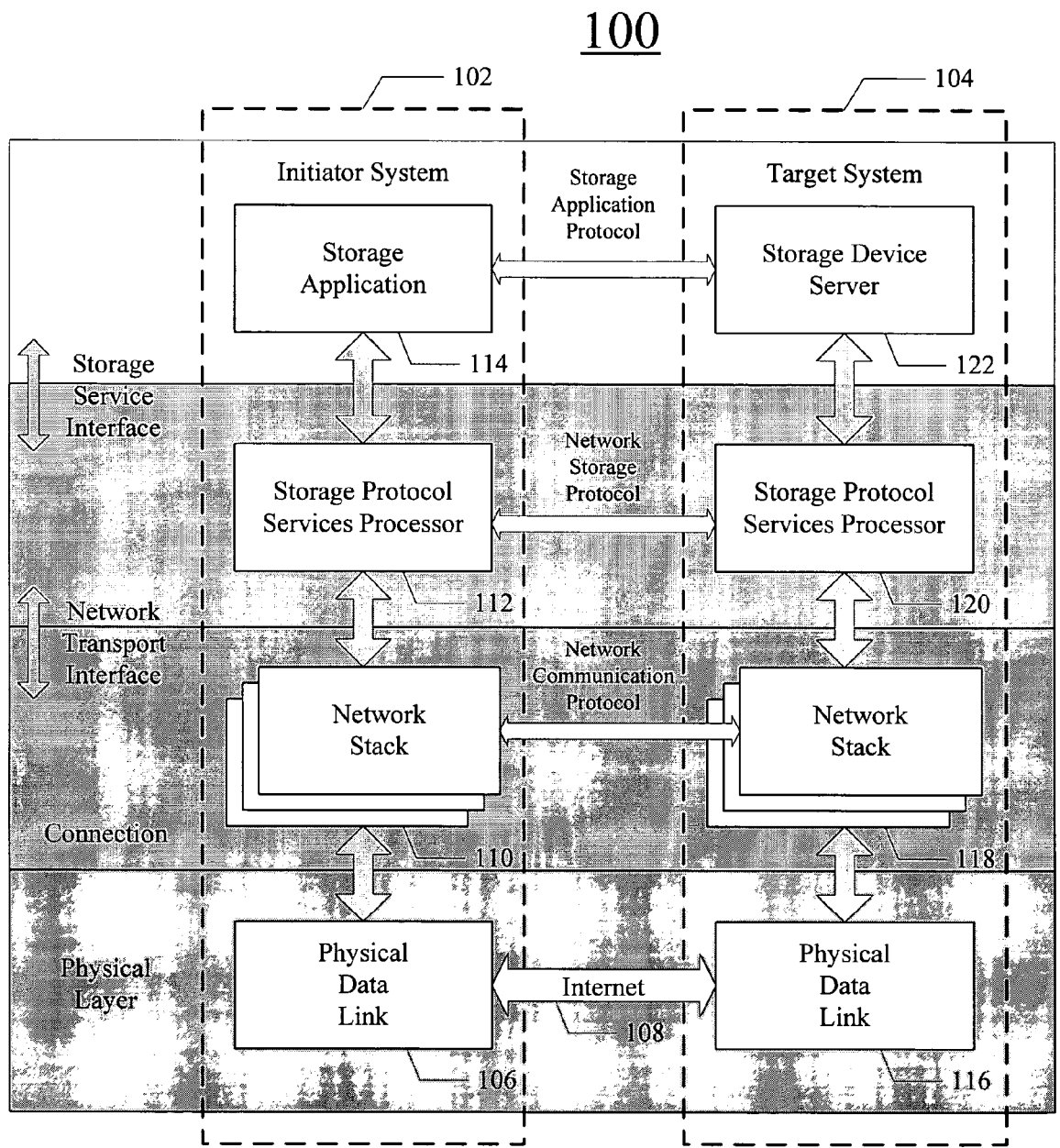
FIG. 1 is a diagram showing the protocol stack in a typical Data Network System.

The method and system for Marker insertion of the present invention is useful in data transmission systems such as those based on the TCP/IP protocol. FIG. 1 shows a Data Network 100 which may employ standard networking protocols such as TCP/IP as well as storage protocols such as SCSI. The Data Network 100 comprises and Initiator System 102 and a Target System 104. The Initiator System 102 includes a Physical Data Link 106 which provides a physical connection to the Internet 108 via any type of physical connection, such as an Ethernet connection common in most Local Area Networks. The Physical Data Link 106 is coupled to a Network Stack 110 which exchanges data with the Physical Data Link 106 in accordance with a Network Communication Protocol such as TCP/IP. The Network Stack 110 is further coupled to a Storage Protocol Services Processor 112 that exchanges data with Network Stack 110. The Storage Protocol Processor 112 processes requests from a Storage Application 114 and encapsulates or decodes packets as requested by Storage Application 114 in accordance with a predetermined data storage protocol such as SCSI.

The Target System 104 includes a set of components that complement those of the Initiator System 102. Specifically, the Target System 104 comprises a Physical Data Link 116, a Network Stack 118, a Storage Protocol Services Processor 120 and a Storage Device Server 122, wherein each of the respective devices in Data Network 100 at each layer are in logical communication with each other. For example, each of the respective Network Stacks 110, 118 are in cooperative communication through the Physical Data Links 106, 116 to establish and maintain connections, via a Network Communication Protocol such as TCP/IP over the Internet 108, by addressing the appropriate target and destination IP addresses, and opening ports and sockets during an active connection. Similarly, the respective Storage Protocol Services Processors 112, 120 are in logical communication with each other in establishing connections, negotiating parameters and exchanging Data Communication Packets such as those specified in the iSCSI specification. Finally, the Storage Application 114 is in logical communication with the target Storage Device Server 122 in the exchange of data blocks, such as those defined in the SCSI specification.

In operation, the respective Initiator and Target systems 102, 104 operate as typical host and storage devices that are logically coupled with a network connection and through the various service and transport layers below. Thus, any distance limitations imposed by the physical characteristics of the directly connected storage interfaces are eliminated. Further, in many network configurations, Personal Computers, Servers and various Network Attached storage devices will include complementary Target and Initiator Systems. However, the present invention is particularly useful in the context of one device initiating a data communication session with another.

Figure 2:
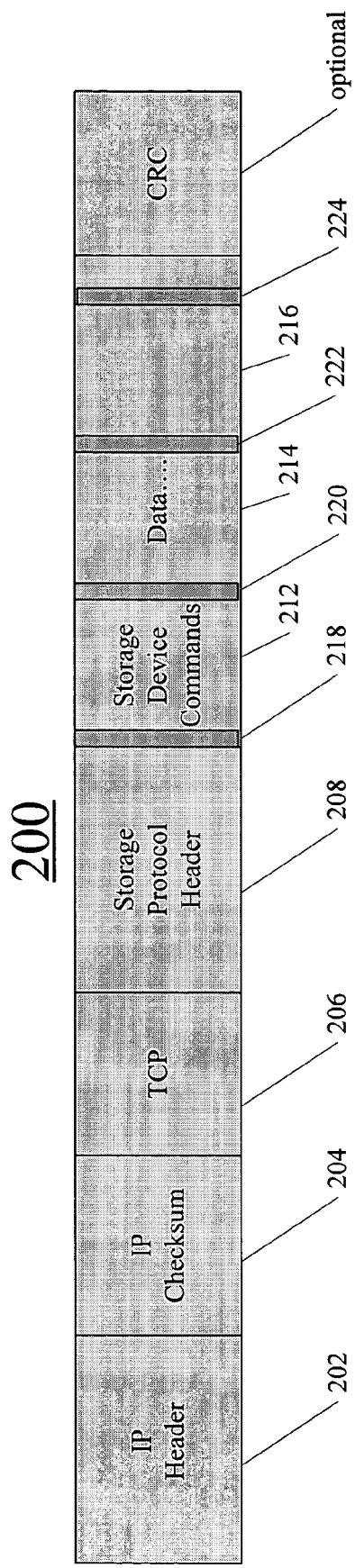
FIG. 2 is a diagram of a data structure of typical TCP/IP Data Communication Packet, which may include Interval Markers.

FIG. 2 shows an exemplary Data Communication Packet 200 for transmission via TCP/IP according to the iSCSI Specification. As shown, the Data Communication Packet 200 includes an IP Header 202 and a TCP header 206 which are defined in accordance with the industry standard TCP/IP protocol. IP and TCP headers are used in establishing connections and include parameters such as a source address, destination address, and port identification. The TCP/IP protocol also provides for the insertion of an IP checksum 204 between the IP Header 202 and TCP Header 206 that may be used for error correction. Following the TCP Header 204 are a Storage Protocol Header 208 Storage Device Commands 212, and Data Blocks 214, 216. An optional CRC value may be appended to the end of Data Communication Packet 200 for error correction. The Storage Protocol Header 208 may include a number of parameters such as the length of desired Interval Markers, the desired interval between Interval Markers, etc. The storage device commands include standard commands such as those used in directly attached SCSI systems.

As will be described in greater detail below, Interval Markers 218–224 may be inserted in accordance with a predetermined network protocol, such as the one described in the iSCSI Specification, although those skilled in the art will appreciated that Markers may be useful in many applications, where the tracking of specific data blocks is desired.

Since the Network Storage Protocol Header 208, Storage Device Commands 212, and Data Blocks 214, 216 are exchanged between Initiator and Target Systems as blocks within a TCP/IP connection, the physical transport layer becomes somewhat irrelevant. The Network Storage Protocol and Storage Device information appear as nothing more than a string of binary values sent over a physical layer. As such, the entire internet infrastructure is available as a physical transport mechanism for data block transfers.

Figure 3:
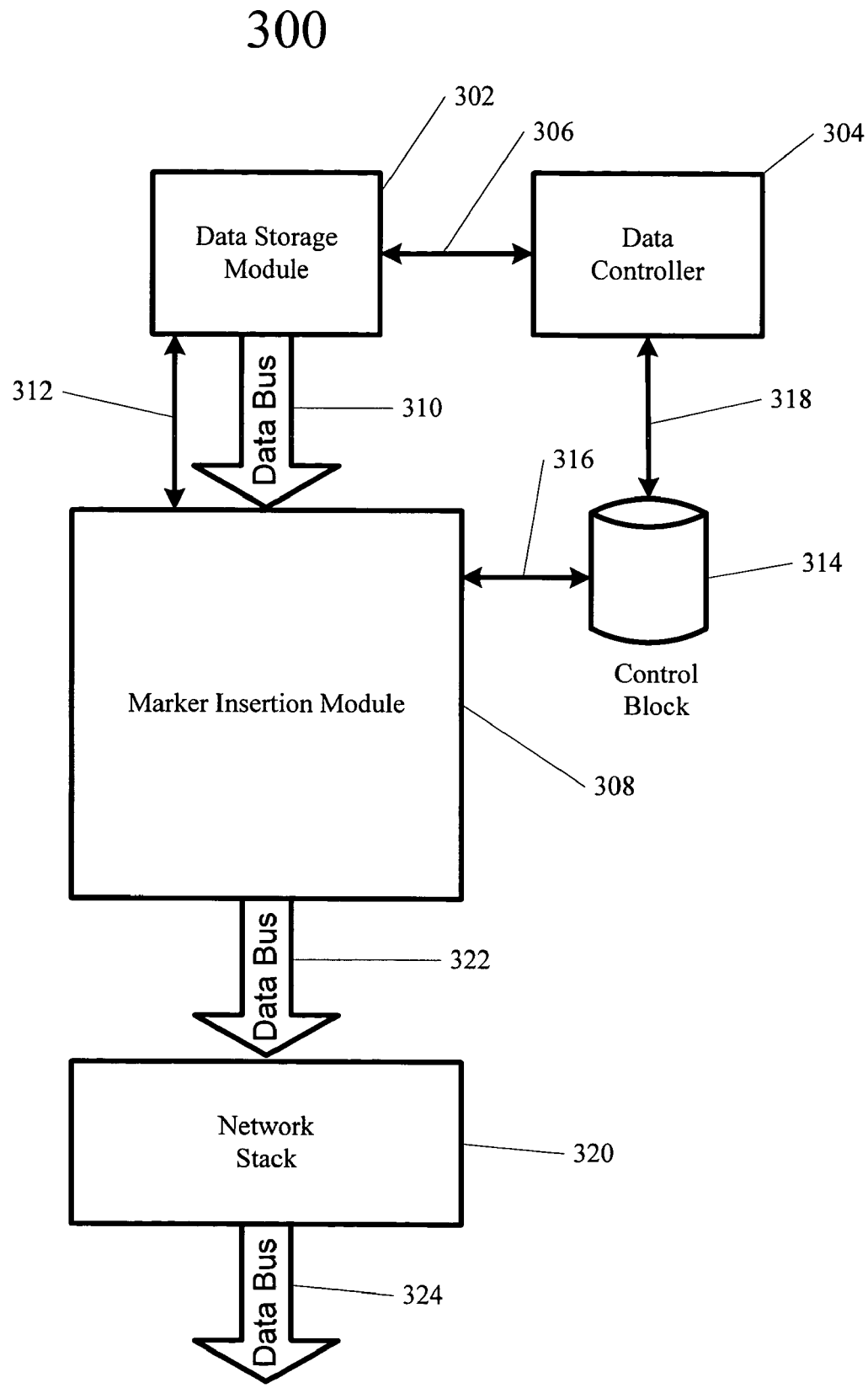
FIG. 3 is a system diagram a Data Transmission System which employs the Marker insertion system and method of the present invention.

Referring now to FIG. 3, a system diagram of Data Transmission System 300 is shown. Those skilled in the art will appreciate that the Data Transmission System 300 may be implemented in any of a number of ways including implementation entirely in software or hardware, or any combination thereof. As data transmission rates continue to increase, it is becoming increasingly difficult for typical Central Processing Units found in Personal Computers and Servers to manage data traffic without having a negative impact on total system performance. Thus, it is becoming increasingly common for data transmission systems such as those based in the iSCSI Specification to be implemented in devices known as Transmission Offload Engines.

An overview of various Transmission Offload schemes is available from the Storage Networking Industry Association (SNIA). For example, a Whitepaper published by the SNIA IP Storage Forum and entitled *iSCSI Building Blocks for IP Storage Networking* discusses various iSCSI implementations and Transmission Offload Engines. The Data Transmission System 300 is suitable for use as an implementation of Target System 104.

In the Data Transmission System 300, a Data Storage module 302 is used to store data in a host system such as a Personal Computer, Server or Network Storage Device and may include one or several hard disk drives or any type of random access memory. The Data Storage Module 302 is coupled to Data Controller 304 with Memory Control Bus 306. Data Storage Module 302 is further coupled to Marker Insertion Module 308 through Data Bus 310 and Control Bus 312. Control Bus 312 is used to synchronize transfers of data between the Data Storage Module 302 and Marker Insertion Module 308. Control Block 314 is cooperatively coupled to Marker Insertion Module 308 with Control Bus 316. Control Block 314 is further coupled to Data Controller 304 with Control Bus 318. The specific operation of the various control busses 306, 312, 316 and 318, Data Controller 304, Control Block 314 and Marker Insertion Module 308 is discussed in further detail below.

The output of Marker Insertion Module 308 is coupled to the Network Stack 320 with Data Bus 322 for integration with the Data Communication Packet 200 described in conjunction with FIG. 2. Once the Data Communication Packet 200 has been aggregated in Network Stack 320, it is then sent to the Physical Data Link 116 via Data Bus 324.

Figure 4:
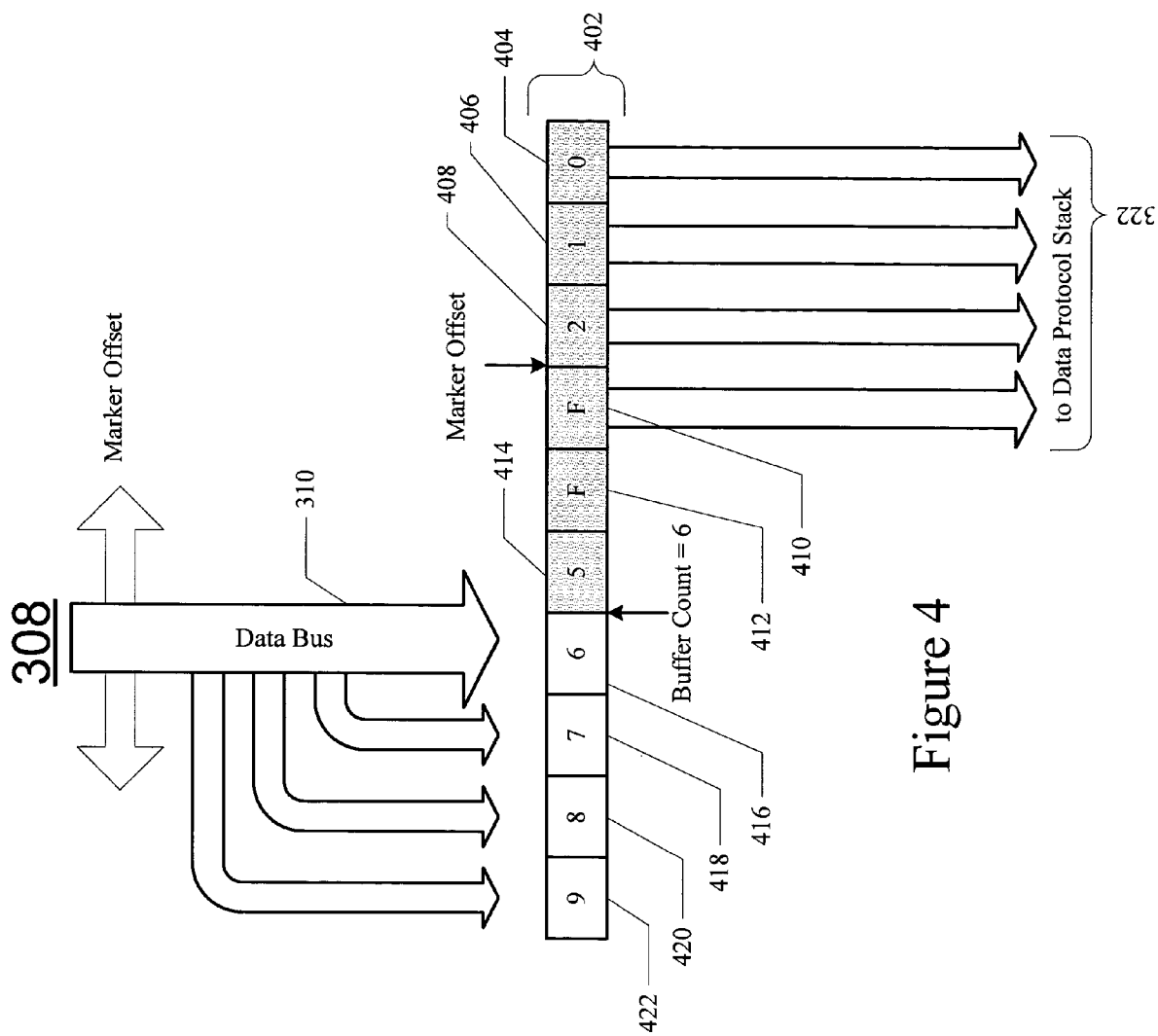
FIG. 4 is a detailed diagram of an exemplary Buffer structure suitable for use in the Data Transmission System of FIG. 3.

Referring now to FIG. 4, a detailed diagram of Marker Insertion Module 308, and Data Busses 310 and 322 are shown. The interaction of the various control busses and systeni parameters used during the operation of the present invention are also described. Marker insertion Module 308 includes a Buffer 402 having a predetermined number of registers, where each register can store a single dword. In the example shown in FIG. 4, Buffer 402 utilizes ten (10) registers 404–422, each of which can state a 32-bit dword, although Buffer 402 could easily be modified to accommodate dwords of any width, or could be modified to have greater depth, for example, in the form of a register queue. A number of parameters affect the overall performance of Marker Insertion Module 308. The width of Data Bus 310 is represented by the parameter (DBin). In the example shown in FIG. 4, DBin=128 bits, or four (4) 32-bit dwords. Thus, four (4) 32-bit dwords can be read into the registers of Buffer 402 in a single clock cycle. The width of Data Bus 322 is represented by the parameter (DBout). In the example shown in FIG. 4, DBout=128 bits, or (4) 32-bit dwords. Thus, four 32-bit dwords can be read out of Buffer 402 in a single clock cycle.

In the example shown, registers 404–410 are dedicated for use as Buffer output registers, although if they do not contain valid data, they may be used to input data from Data Bus 310 as well. Additional registers are included to input data from Data Bus 310 and to provide ample room for Marker insertion and register re-ordering, which is discussed in further detail below.

Other parameters used in the operation of Marker Insertion Module 402 include the parameter (Lvi) which indicates the length of valid input data. Lvi has a range between 1 and DBin. In other words, in the present invention, the number of dwords which can be read into Buffer 402 is variable, depending on the width of a dword and the value of DBin. In prior systems, only uniform values are used. The parameter Marker Length (ML) indicates the size of the Marker to be inserted into the data stream. In some cases ML may consist of two adjacent dwords in the event that a Marker spans a data transmission boundary. The variable (MI) indicates the Marker Interval or the distance between Markers. Typically, MI is constant at a predetermined value, although this value may vary for any given connection.

The depth of Buffer 402 is indicated by the parameter (Q) which represents the number of dwords that can fill Buffer 402. While the principles of the present invention can be applied to Buffers of any size, the optimum Q value=DBin+DBout+ML which accounts for data streaming in the worst case scenario while eliminating system deadlocks.

Variables and parameters are managed in the Control Block 314. Data Controller 304 operates in cooperation with Control Block 314 to effect data block transfers as requested by Control Block 314. The value of variable Buffer Count (BC) represents the current number of registers in Buffer 402 containing valid, data. The value of BC can range from 0 to Q. In operation, it is initialized at zero the start of a data transfer from host memory, incremented as Buffer 402 is filled, and decremented to zero at the end of each data transfer.

The variable MO or Marker Offset represents how many dwords remain prior to insertion of the next Interval Marker. At the beginning of a data transfer, MO is initialized with the value of MO from the previous transfer. At the end of the data transfer, the last value of MO is stored for use during the next data transfer. The following relationships define the operation of Buffer 402 as data is read into and out of Buffer 402:

At the start of a transfer of data from host memory: BC=0; and MO=value of MO from the last transfer.

If new input data is read into the Buffer 402:

$BC(\text{new})=(BC(\text{old})+DB\text{in})$

If data is read out of Buffer 402:

$BC(\text{new})=(BC(\text{old})-DB\text{out})$; and $MO(\text{new})=(MO(\text{old})-Db\text{out})$ If a Marker is inserted into the data stream:

$BC(\text{new})=(BC(\text{old})+ML)$ and $MO(\text{new})=(MO(\text{old})+MI)$

In operation, if new data is present and available in host memory, it is transferred to Buffer 402 over Data Bus 310 on a continuous basis. The variable MO is used as a pointer to indicate which of the registers 404–422 constitute the first available register for accepting new data as the registers are filled from left to right. In the example shown, a data transfer will not occur if the variable BC greater than DBin.

Figure 5:
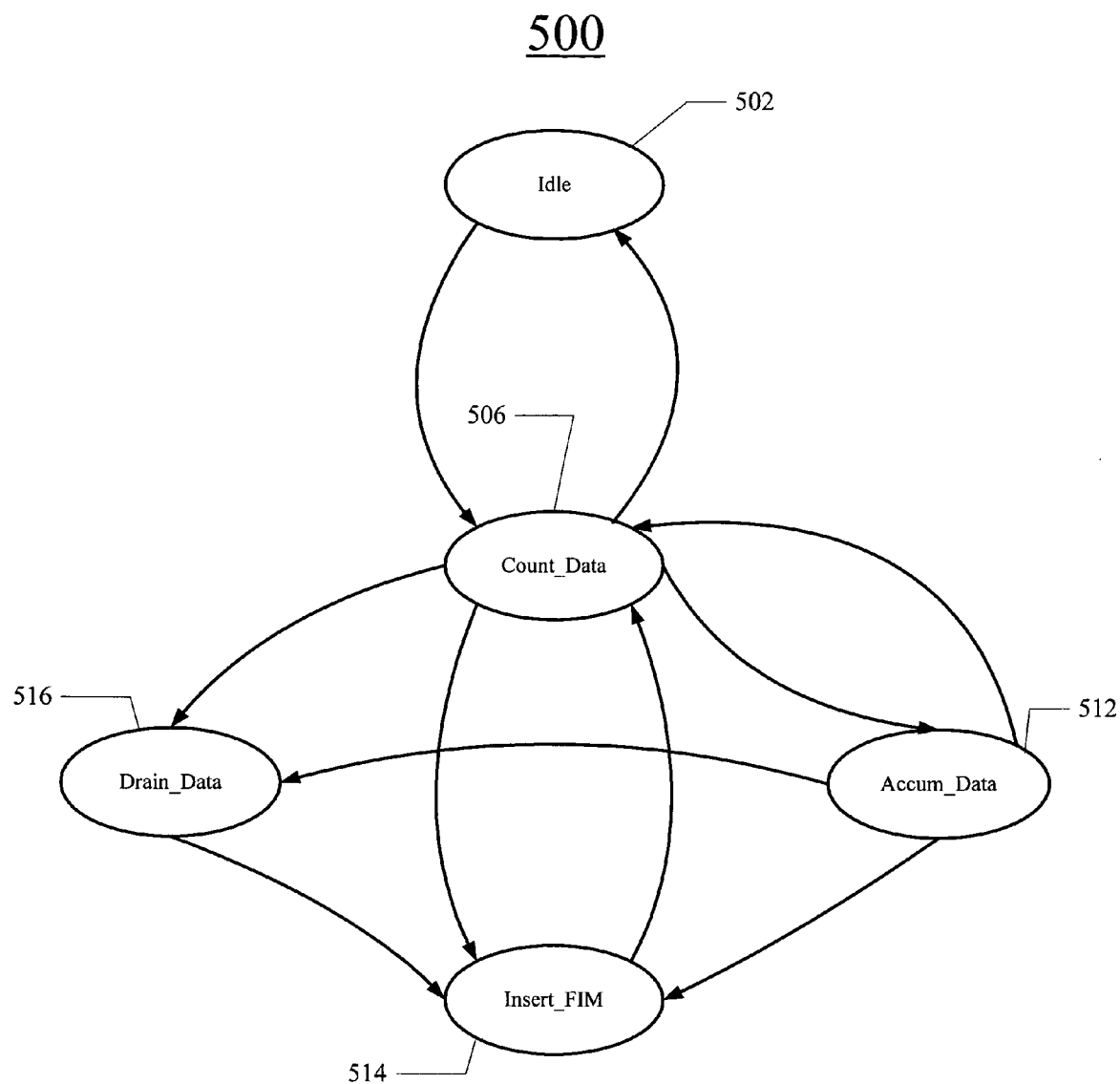
FIG. 5 is a state diagram detailing the operation and use of the Buffer and registers of FIG. 4–6.

FIG. 5 shows a state diagram 500 which illustrates the overall operation of Data Transmission System 300. In a quiescent state, Buffer 402 is empty in idle state 502 until Data Controller 304 asserts a signal on Control Bus 3306 that indicates that Data Storage Module 302 should initiate a data transfer to Marker Insertion Module 308. Once a data transfer has been initiated, Data Transmission System 300 enters state 506 which accounts for data block transfers with a variable designated Count_Data. While in state 506, two events are possible. Specifically, the first event occurs if (BC+DBin) is less than or equal to Q, which indicates Buffer 402 has sufficient vacant registers to receive new data. The second event occurs if BC is greater than or equal to DBout, which indicates Buffer 402 has enough valid data to transfer to Network Stack 320. If the variable MO is less than the parameter Q, an Interval Marker insertion is pending and will be inserted somewhere between the data blocks temporarily stored in Buffer 402. Otherwise, Data Transmission System 300 enters state 512, which monitors data traffic with the variable Accum_Data.

In the event (BC+ML) is less than or equal to Q, there are enough vacant registers in Buffer 402 to accommodate Interval Marker insertion and Data Transmission System 300 enters State 512, designated Insert_FIM. In State 514, If Buffer 402 does not have sufficient vacant registers to accommodate Interval Marker insertion, Data Transmission System 300 transitions to State 516 designated Drain_Data. These relationships are summarized as follows:

Transition=>State 512: IF $(BC+M)>Q$

Transition=>State 516: IF $(BC+ML) \leq Q$

Transition=>State 514: IF $(MO<Q)$ and $(B \geq MO)$ and $((B+MO) \leq Q)$

Transition=>State 502: IF $DBin=0$

While in State 512, if $((MC+ML) \geq Q)$, enough data has accumulated in registers 404–422 to insert an Interval Marker. If $((BC+M) \leq Q)$, there is sufficient room in Buffer 402 to insert Interval Markers. In this case, a transition to State 514 occurs. Otherwise a transition to State 516 occurs. These relationships are summarized as follows:

Transition=>State 514: IF $(BC+ML) \leq Q$

Transition=>State 516: IF $(BC+ML) \leq Q$

When in State 516, Data Transmission System 300 transfers data in Output registers 404–408 to Network Stack 320 to clear enough register space in Buffer 402 to accommodate the insertion of Interval Markers.

State 516 is characterized as follows:

Transition=>State 506: IF $(BC+ML) \leq Q$

State 514 is characterized as follows:
Insert Marker; and
Transition=>State 502

Figure 6:
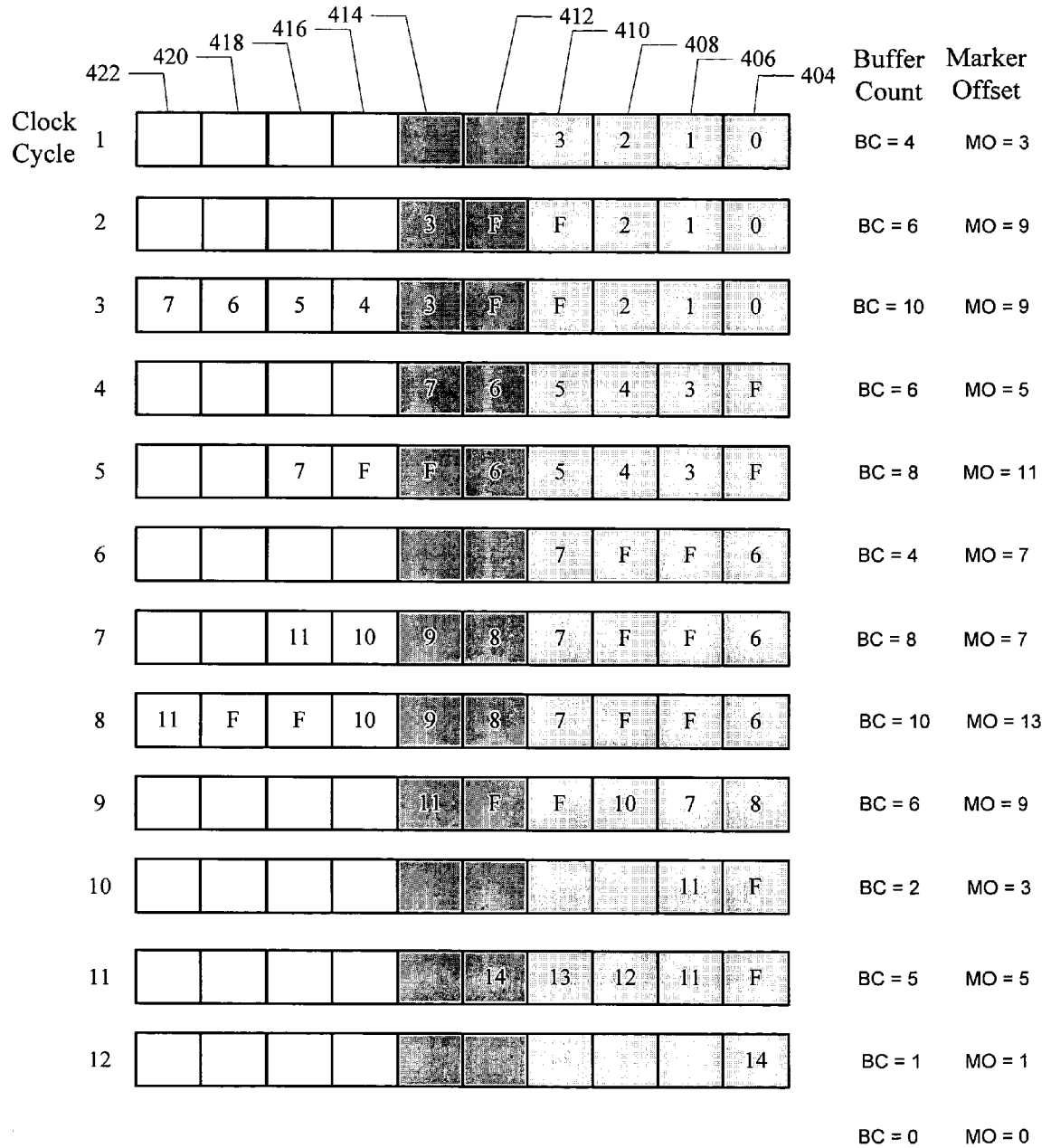
FIG. 6 shows a register model of the Buffer structure of FIG. 4 demonstrating various states of the contents of the Buffer structure of FIG. 4, during a typical data transmission.

FIG. 6 shows a typical sequence of data processed by Marker Insertion Module 308 as it passes through Buffer 402. At clock cycle 1, registers 404, 406, 408 and 410 contain valid data, and BC=4, and MO=3. Since BC is greater than MO, an Interval Marker is inserted in registers 410, 412 and the prior contents of register 410 are moved to register 414 at clock cycle 2. MO is incremented to 9, reflecting the fact that an Interval Marker has been inserted, and is set to point to the next instance of an Interval Marker. In clock cycle 3, new data is read into registers 416–422, respectively and BC is incremented to 10, indicating Buffer 402 is full. In clock cycle 4, the contents of registers 404–410 are transferred to Network Stack 320 and the remaining contents of Buffer 402 are right-shifted, thus clearing registers 416–422 to accept new data. At the same time, the variable BC is updated to indicate four registers are available and the variable MO is updated to indicate an Interval Marker should be inserted five dwords later. In clock cycle 5, Interval Markers are inserted in registers 414 and 416, respectively, as indicated by the value of MO and the contents of register 418 in clock cycle 4 are shifted to register 418 to accommodate the inserted Interval Markers. Variable BC is incremented to a value of 8 indicating that registers 420, 422 are vacant, and variable MO is updated to a value of 11.

After clock cycle 5, Buffer 402 cannot accept another data transfer, so in clock cycle 6, the contents of registers 404–410 are transferred to Network Stack 320 and the contents of Buffer 402 are right-shifted, thus clearing registers 412–422. Variable BC is updated to a value of 4 indicating there are 6 available registers in Buffer 402 and Variable MO is updated to a value of 7. In clock cycle 7, four new data packets are read into registers 412–418 and variables BC and MO are updated to values of 8 and 7, respectively. In clock cycle 8, Interval Markers are inserted in registers 416–418, respectively and the contents of register 418 in clock cycle 7 are shifted to register 422, to accommodate the inserted Interval Markers, and BC and MO are updated accordingly. The overall pattern continuously cycles until the last data block in a given transmission is reached, as shown at clock cycle 12, wherein register 404 contains a single data block. Once the data block in register 404 is transferred out of Buffer 402, the variables BC and MO are reset to zero (0), indicating a return to idle state 502.

While the various embodiments described above have been described with reference to the iSCSI specification, it should be understood that they have been presented by way of example only, and not limitation. Thus, the breadth and scope of a preferred embodiment should not be limited by any of the above-described exemplary embodiments, but should be defined only in accordance with following claims and their equivalents.

What is claimed is:

1. A method for inserting interval markers in a data stream comprised of data blocks said method comprising:
   a) storing data blocks in a buffer having a predetermined number registers;
   b) outputting said data blocks from said buffer while counting the number of data blocks that have been stored in said registers; and
   c) inserting interval markers between said data blocks at predetermined intervals within said data stream prior to outputting said data blocks, said predetermined intervals determined in accordance with the number of data blocks counted and a desired marker interval.

2. The method of claim 1, wherein the number of said predetermined registers in said buffer is optimized to include a sufficient number of registers to receive and output data blocks, and registers for interval marker insertion.

3. The method of claim 1 wherein said storing data blocks begins upon a request for data from an initiator device, said request including parameters which define the characteristics of said interval markers.

4. A method for inserting interval markers into a data stream consisting of data blocks, said data stream generated in response to a request from an initiator device, said method comprising the steps of:
   a) establishing a set of parameters for said data stream upon a request from said initiator device, said parameters including a block count value, and a marker offset value indicating that interval markers are required at specified intervals within said data stream;
   b) storing said data blocks in a buffer having a predetermined number of registers;
   c) initializing said block count value upon receiving said request from said initiator device, said block count value for indicating the number of data blocks within said data stream which have been read into said registers;
   d) initializing said marker offset value upon receiving said request from said initiator device, said marker offset for indicating the next instance for insertion of an interval marker;
   e) inserting interval markers between data blocks stored in said registers as specified by said parameters, and indicated by said block count value and said marker offset value;
   f) outputting the contents of a portion said predetermined number of registers of said buffer to generate said data stream, when said block count value indicates sufficient data is present in said buffer.

5. The method of claim 4 wherein said block count value is initialized with a value of zero and is incremented to count data blocks while storing data blocks in said buffer and is decremented as data blocks are read out of said buffer.

6. The method of claim 4, wherein the number of said predetermined registers in said buffer is optimized to include a sufficient number of registers to store input and output data blocks, as well as interval markers.

7. The method of claim 4 wherein said storing data blocks in said buffer begins upon a request for data from an initiator device, said request including parameters which define the characteristics of said interval markers.

8. The method of claim 4 wherein said buffer count (BC) value is determined according to the relationship: BC=(BC+DBin), wherein DBin=data bus in, wherein at the start of a transfer of data from host memory, BC=0.

9. The method of claim 4 wherein said marker offset (MO) value is initialized with a value of zero and wherein if data is read out of said buffer, the value of said buffer count (BC) is determined according to the relationship: BC (new)=(BC (old)−DBout), wherein DBout=data bus out, and the value of said marker offset is defined as MO (new)=(MO (old)−DBout).

10. The method of claim 4 wherein upon insertion of an interval marker between data blocks, said buffer count (BC) value is determined according to the relationship: BC (new) =(BC_(old)+ML), wherein ML=marker length. and the value of said marker offset is determined according to the relationship: MO (new)=(MO (old)+MI), wherein MI=marker interval.

11. A method for inserting interval markers in a data stream consisting of data blocks, said data stream communicated between a storage device and a storage application, said method comprising the steps of:
   a) establishing a connection between said storage device and said storage application, said connection being defined by a plurality of parameters, said parameters including the number of data blocks to be transmitted and the desired intervals between said interval markers in said data stream;
   b) reading said data blocks from said storage device into a buffer having a predetermined number of registers, said data blocks read into said registers in groups of data blocks, said registers for temporarily storing said groups of data blocks, wherein said buffer includes sufficient registers for simultaneously storing at least first and second groups of data blocks as well as registers for storing said interval markers;
   c) initializing a block count value at the beginning of said connection for counting said data blocks as they are read into said registers, said block count value being continuously updated to indicate how many registers in said buffer contain valid data;
   d) initializing a marker offset value at the beginning of said connection, said marker offset value being continuously updated to indicate the next location for insertion of an interval marker between said data blocks within said data stream;
   e) inserting said interval markers between data blocks stored in said registers as indicated by said block count value and said marker offset value; and
   f) reading said data blocks and said interval markers from said buffer for transmitting said data blocks to said storage application to generate said data stream, when said block count value indicates there is sufficient data in said registers for transmission.

12. A system for inserting interval markers in a data stream, said system comprising:
   a) a host memory device for storing data blocks;
   b) a buffer, coupled to said host memory device, for temporarily storing of data blocks read from said host memory device;
   c) a marker generator for inserting interval markers at predetermined intervals between data blocks stored in said buffer, said predetermined intervals determined in accordance with a number of data blocks counted and a desired marker interval; and d) a data transmitter, coupled to said buffer, for transmitting data in accordance with a data communication protocol.

13. A system for inserting interval markers in a data stream comprising data blocks, said system comprising:
   a) a host memory device for storing data blocks;
   b) a buffer having a predetermined number of registers, coupled to said host memory device, for storing predetermined data blocks read from said host memory device;
   c) a first counter for indicating the number of registers in said buffer containing valid data blocks;
   d) a second counter for indicating the next instance for insertion of an interval marker with respect to said data blocks stored in said buffer;
   e) a data transmitter, coupled to said buffer, for transmitting data blocks in accordance with a data communication protocol whenever said first counter indicates said buffer contains sufficient data for transmission; and
   f) a marker insertion module for inserting interval markers at predetermined intervals between said data blocks stored in said buffer as indicated by said second counter.

* * * * *

UNITED STATES PATENT AND TRADEMARK OFFICE
CERTIFICATE OF CORRECTION

PATENT NO. : 7,206,872 B2  
APPLICATION NO. : 10/783766  
DATED : April 17, 2007  
INVENTOR(S) : Addison Chen Page 1 of 1

It is certified that error appears in the above-identified patent and that said Letters Patent is hereby corrected as shown below:

Col. 9, line 59, please replace "(BC_(old)" with --BC (old)--;  
Col. 9, line 59, please replace "length. and" with --length, and--.

Signed and Sealed this  
Twenty-sixth Day of February, 2013

Teresa Stanek Rea  
*Acting Director of the United States Patent and Trademark Office*